United States Patent
McIver et al.

(10) Patent No.: US 8,581,736 B2
(45) Date of Patent: Nov. 12, 2013

(54) ASSESSING STRUCTURAL REPAIR INTEGRITY

(75) Inventors: Keith L. McIver, Seal Beach, CA (US); Aristidis Sidiropoulos, Seal Beach, CA (US); Russell L. Keller, Maple Valley, WA (US); Cong N. Duong, Yorba Linda, CA (US)

(73) Assignee: The Boeing Company, Chicago, IL (US)

( * ) Notice: Subject to any disclaimer, the term of this patent is extended or adjusted under 35 U.S.C. 154(b) by 654 days.

(21) Appl. No.: 12/823,108

(22) Filed: Jun. 24, 2010

(65) Prior Publication Data

US 2011/0316712 A1    Dec. 29, 2011

(51) Int. Cl.
   *G08B 21/00*   (2006.01)
(52) U.S. Cl.
   USPC .................. 340/665; 702/42; 73/801; 73/802
(58) Field of Classification Search
   USPC ............ 340/665, 539.1, 870.03, 870.11, 506; 702/35, 42, 183, 187; 73/799, 800, 73/803, 806, 588, 801, 802
   See application file for complete search history.

(56) References Cited

U.S. PATENT DOCUMENTS

| | | | |
|---|---|---|---|
| 4,939,368 A | | 7/1990 | Brown |
| 5,754,122 A | * | 5/1998 | Li et al. ..................... 340/870.11 |
| 6,871,156 B2 | * | 3/2005 | Wallace et al. ............... 702/127 |
| 7,333,898 B2 | | 2/2008 | Griess et al. |
| 7,377,181 B2 | | 5/2008 | Christ et al. |
| 7,398,698 B2 | | 7/2008 | Griess et al. |
| 7,477,995 B2 | | 1/2009 | Hovis et al. |
| 7,533,818 B2 | | 5/2009 | Hovis et al. |
| 7,908,928 B2 | * | 3/2011 | Vik et al. ......................... 73/806 |
| 7,983,854 B2 | * | 7/2011 | O'Brien .......................... 702/42 |
| 8,170,836 B1 | * | 5/2012 | Champaigne et al. ........ 702/187 |
| 2006/0173638 A1 | | 8/2006 | Hovis et al. |
| 2007/0100582 A1 | * | 5/2007 | Griess et al. .................. 702/183 |
| 2008/0223152 A1 | | 9/2008 | Georgeson et al. |
| 2011/0106459 A1 | * | 5/2011 | Christ et al. .................... 702/42 |

FOREIGN PATENT DOCUMENTS

WO    9514917    6/1995

OTHER PUBLICATIONS

Takeda, S., et al., "Debonding Monitoring of Composite Repair Patches Using Embedded Small Diameter FBG Sensors," Smart Materials and Structures, IOP Publishing Ltd, Bristol, GB, vol. 16, No. 3, Jun. 1, 2007.
Li HCH, et al,: "Strain-Based Health Assessment of Bonded Composite Repairs," Composite Structures, Elsevier Science, Ltd, GB, vol. 76, No. 3, Nov. 1, 2006.

(Continued)

*Primary Examiner* — Hung T. Nguyen

(74) *Attorney, Agent, or Firm* — Caven & Aghevli LLC

(57) ABSTRACT

A strain measurement device to assess the integrity of a structural repair to a surface comprises a detector, a processor, and a memory module coupled to the processor. The memory module comprises logic instructions stored in a computer readable medium which, when executed by the processor, configure the processor to use the detector to obtain a first strain measurement from an external strain indicator, use the detector to obtain a second strain measurement from the measurement sensor after at least one stress test is applied to the structural repair, and generate a signal when a difference between the first strain measurement and the second strain measurement exceeds a threshold.

21 Claims, 7 Drawing Sheets

(56) References Cited

OTHER PUBLICATIONS

Baker, A., et al., "Towards a Practical Structural Health Monitoring Technology for Patched Cracks in Aircraft Structure," Composites Part A: Applied Science and Manufacturing, Elsevier Science Publisheres, B.V., Amsterdam, NL, vol. 40, No. 9, Sep. 1, 2009.
International Search Report mailed Aug. 2, 2011.
Fraunhofer Research News, Nov. 10, 2009.

* cited by examiner

ASSESSING STRUCTURAL REPAIR INTEGRITY

RELATED APPLICATIONS

None

BACKGROUND

The subject matter described herein relates to the structural repair of vehicles, and more particularly to a patch load indicator which may be used to assess the integrity of a repair on a surface of a vehicle.

Surface skins of vehicles, e.g., aircraft, watercraft, and automobiles, may require periodic repair for in-service damage. For example, aircraft may experience small stress cracks near rivet holes or along seams of connecting panels. Similarly, panels may be cracked by impact damage from birds or other airborne articles. Small cracks may be repaired with temporary patches which are positioned over the crack. Accordingly, systems and methods to assess the integrity of a repair on a surface of a vehicle may find utility.

BRIEF DESCRIPTION OF THE DRAWINGS

The detailed description is described with reference to the accompanying figures.

SUMMARY

Figure 1A:
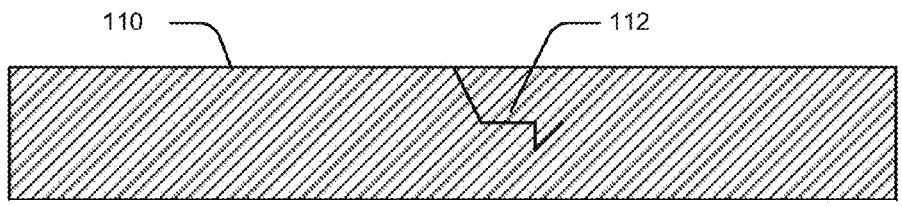
FIG. 1A is a schematic cross-sectional illustration of a surface defect, according to embodiments.

Described herein are embodiments of systems, devices, and methods to assess the integrity of a structural repair to a surface. In some embodiments, a method to assess the integrity of a structural repair to a surface comprises applying a strain indicator proximate the structural repair, obtaining, in a strain measurement device, a first strain measurement from the strain indicator, applying at least one stress test to the structural repair, obtaining, in the strain measurement device, a second strain measurement from the strain indicator, and generating, in the strain measurement device, a signal when a difference between the first strain measurement and the second strain measurement exceeds a threshold. The signal may be used to generate an alert, which may be presented on a user interface.

In another embodiment, a strain measurement device to assess the integrity of a structural repair to a surface comprises a detector, a processor, and a memory module coupled to the processor. The memory module comprises logic instructions stored in a computer readable medium which, when executed by the processor, configure the processor to use the detector to obtain a first strain measurement from an external strain indicator, use the detector to obtain a second strain measurement from the measurement sensor after at least one stress test is applied to the structural repair, and generate a signal when a difference between the first strain measurement and the second strain measurement exceeds a threshold.

In another embodiment, a computer program product to assess the integrity of a structural repair to a surface comprises logic instructions stored in a computer readable medium which, when executed by a processor, configure the processor to receive a first strain measurement from an external strain indicator, receive a second strain measurement from the measurement sensor after at least one stress test is applied to the structural repair, and generate a signal when a difference between the first strain measurement and the second strain measurement exceeds a threshold.

In another embodiment, a system to assess the integrity of a structural repair to a surface comprises a strain indicator which may be applied proximate the structural repair, a detector to obtain a first strain measurement from an external strain indicator and a second strain measurement from the measurement sensor after at least one stress test is applied to the structural repair, a memory module to store the first strain measurement and the second strain measurement, and an evaluation module to generate a signal when a difference between the first strain measurement and the second strain measurement exceeds a threshold.

DETAILED DESCRIPTION

Described herein are various embodiments of systems, devices, and methods to assess the integrity of a structural repair to a surface. In some embodiments, a strain indicator is positioned proximate the structural repair. By way of example, the strain indicator may be embodied as a deformable planar material that includes one or more features observable in the visible spectrum or outside the visible spectrum. The strain indicator may be adhered to the structural repair on the surface.

A strain measurement device takes one or more measurements from the strain indicator when it is initially positioned on the surface. The measurements may indicate the relative locations of the one or more observable features on the strain indicator. These measurements may be recorded in a memory module. The surface is then placed under stress conditions. Subsequently, the strain measurement device may be used to take one or more additional measurements from the strain indicator, which measurements may also be stored in the memory module.

An analysis module compares the strain measurements collected after the surface was placed under stress with the strain measurements taken before the surface was placed under stress. If the difference between the strain measurements exceeds a threshold then the analysis module generates a signal, which may be used to present a warning on an interface. In some embodiments the analysis module resides as logic instructions in a memory module of the strain measurement device. In other embodiments the analysis module may reside in a remote computer device which may be communicatively coupled to strain measurement device.

Strain measurement data collected by the strain measurement device may be stored in a computer-readable storage medium. The analysis module may analyze the strain measurement data to develop a refined strain for the surface repair. The refined model may be useful for subsequent design and repair analysis.

Figure 1B:
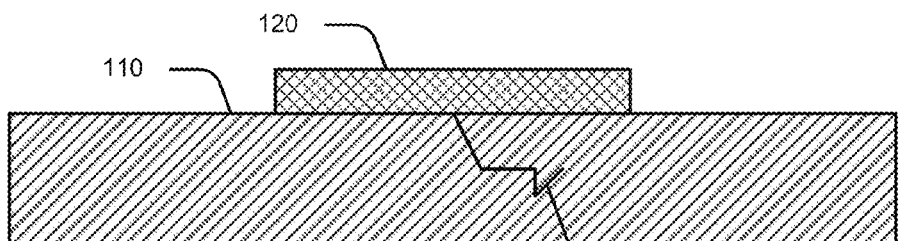
FIG. 1B is a schematic cross-sectional illustration of a surface defect and a patch, according to embodiments.
Figure 1C:
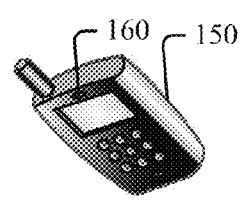
FIG. 1C is a schematic cross-sectional illustration of a surface defect covered by a patch and a strain indicator, according to embodiments.
Figure 1C:
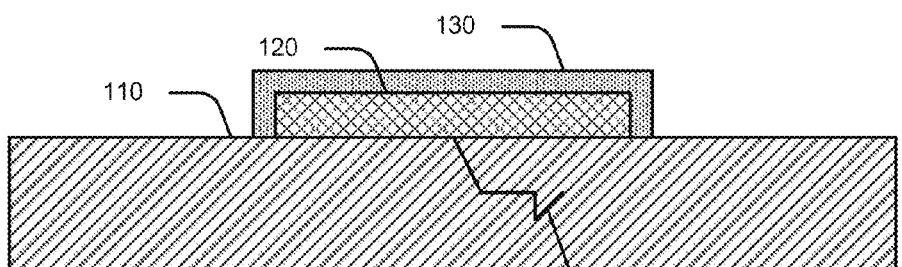

Referring now to FIGS. 1A-1C, a structural surface 110 may develop a defect 112. By way of example, as illustrated in FIG. 1A, a structural surface 110 may be a surface skin of an aircraft, a ship, or a land-based vehicle. Defect 112 may be a surface crack in the skin which may be caused by impact with a foreign object, e.g., a bird or other airborne object. Alternately, defect 112 may be a crack caused by stress in a joint between structural surface panels. Neither the particular nature of defect 112 nor the cause of defect 112 is particularly critical.

Figure 2:
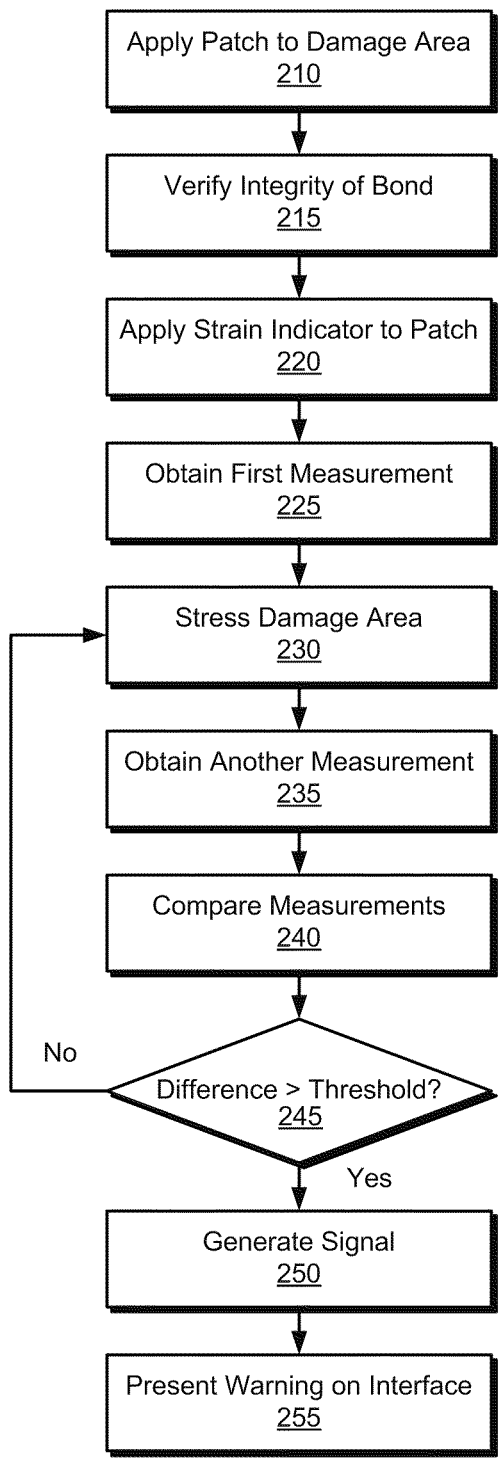
FIG. 2 is a flowchart illustrating operations in a method to assess structural repair integrity, according to embodiments.

Referring to FIG. 1B and FIG. 2, in some circumstances a defect 112 in a structural surface 110 may be repaired, at least temporarily, by applying a repair patch 120 over the defect 112 (operation 210). The repair patch 120 may be formed from a suitable structural material, e.g., aluminum or a composite material such as a graphite-epoxy composite. The particular shape and size of the patch 120 not critical. The patch 120 may be circular, rectangular, or oblong, depending upon the shape and location of the defect 112. The repair patch 120 may be secured to the structural surface 110 by a variety of fastening methods, e.g., by screws, rivets, an adhesive, or even by a weld. Examples of repair patches suitable for aircraft are disclosed in commonly assigned U.S. Pat. No. 7,398,698 to Griess, et al., the disclosure of which is incorporated herein by reference in its entirety.

In some embodiments the integrity of the bond between the repair patch 120 and the structural surface 110 may be verified (operation 215). By way of example, any suitable non-destructive testing technique may be used to verify the integrity of the bond between the repair patch and the structural surface 110.

At operation 220 a strain indicator 130 is applied to the patch 120. In some embodiments a strain indicator 130 may be formed from a deformable material, e.g., a suitable polymer or the like, which may be adhered to the patch 120 using an adhesive. Further, in some embodiments the strain indicator 130 may include an observable geometric pattern. In some embodiments the strain indicator may be a separate physical structure as described with reference to FIGS. 6-8. In other embodiments the strain indicator may be an integral part of the surface of the repair patch 120. By way of example, a pattern of the type described with reference to FIGS. 6-8 may be formed on the surface of the repair patch 120. The pattern may be observable under inspection in the visible spectrum. Alternately the pattern may be observable under inspection by radiation outside the visible spectrum.

Figure 6:
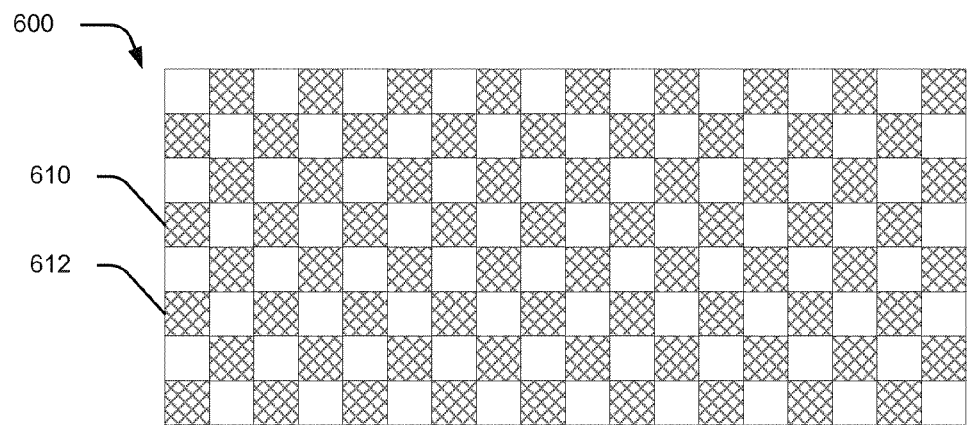
FIG. 6 is a schematic illustration of a strain indicator, according to embodiments.
Figure 7:
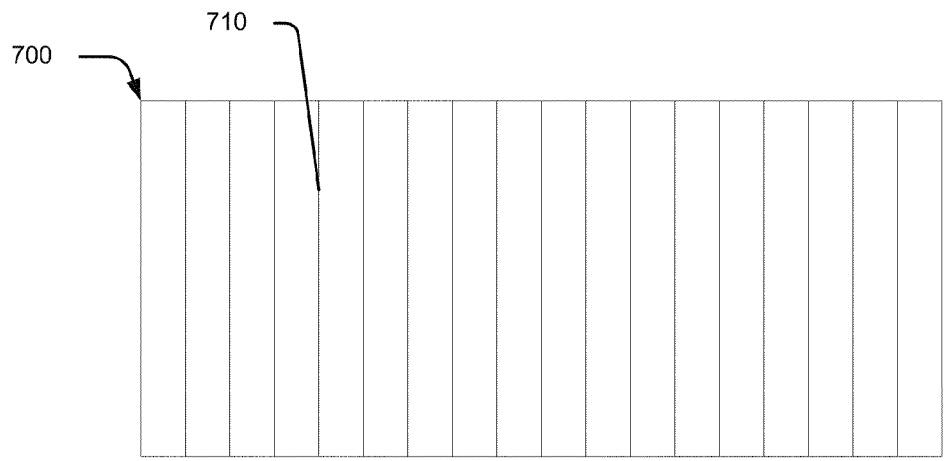
FIG. 7 is a schematic illustration of a strain indicator, according to embodiments.
Figure 8:
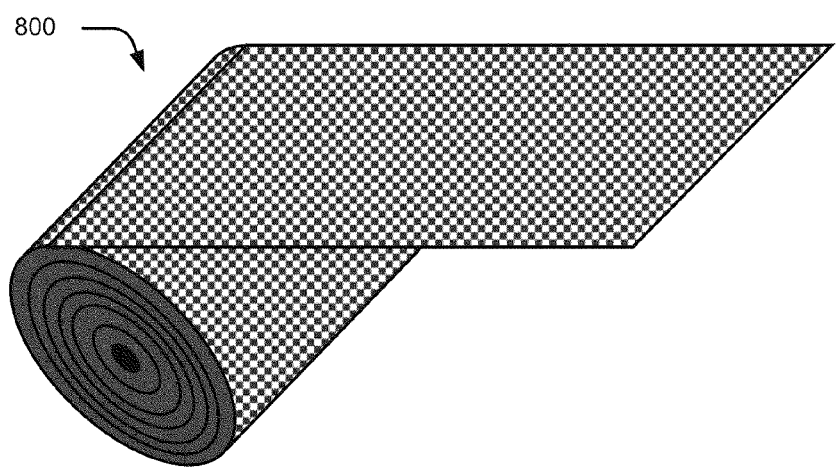
FIG. 8 is a schematic illustration of a strain indicator, according to embodiments.

FIGS. 6-8 are schematic illustrations of embodiments of strain indicators. Referring to FIG. 6, in one embodiment a strain indicator 600. In the embodiment depicted in FIG. 6 the strain indicator 600 comprises a checkerboard pattern of alternating light squares 610 and shaded squares 612. A two-dimensional pattern such as a checkerboard pattern as illustrated in FIG. 6 allows for detection of deformation in two dimensions.

Referring to FIG. 7, in one embodiment a strain indicator 700 comprises a regular pattern of lines 710. A one-dimensional pattern such as a lined pattern as illustrated in FIG. 7 allows for detection of deformation in one dimension, i.e., along its longitudinal extent.

Referring to FIG. 8, in one embodiment a strain indicator 800 may be packaged and sold as a polymeric film with a pattern printed on one surface and an adhesive on the opposing surface, i.e., a polymeric tape. The strain indicator 800 may be manufactured and distributed in roll form such that it can be applied over a patch 120 using conventional tools and techniques.

Referring back to FIG. 2, once the strain indicator 130 is applied (operation 220) to the patch 120 a first strain measurement is obtained (operation 225) from the strain indicator 130. Referring briefly to FIG. 1C, in some embodiments a strain measurement may be obtained by generating an image of the strain gauge 130 using a strain measurement device 150.

Figure 3:
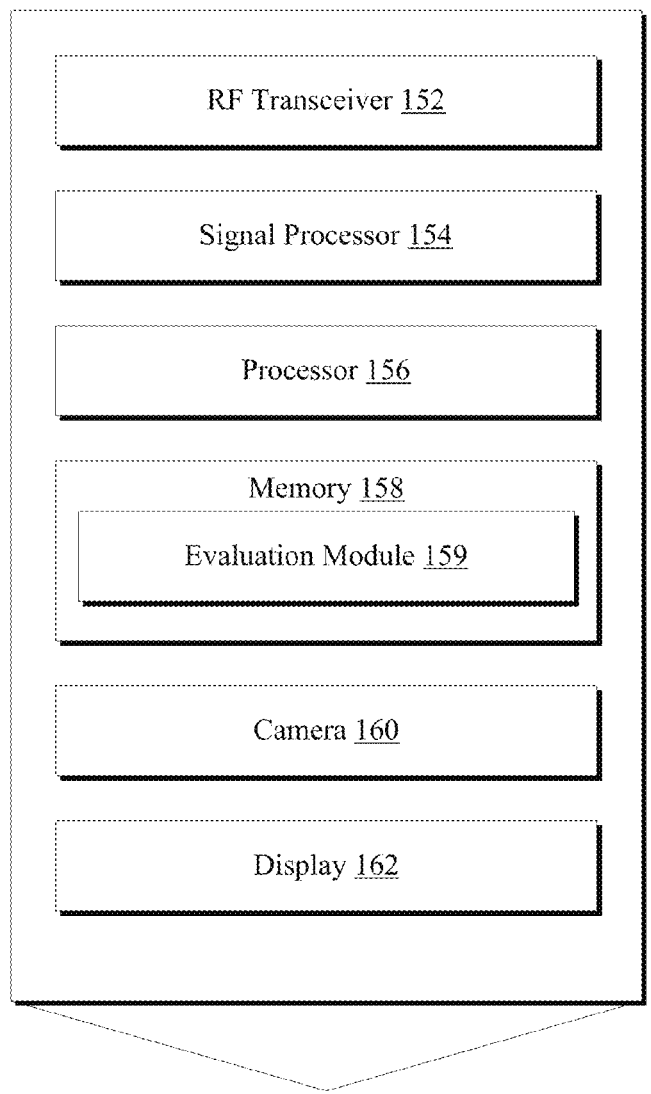
FIG. 3 is a schematic illustration of a strain measurement device, according to embodiments.
Figure 3:
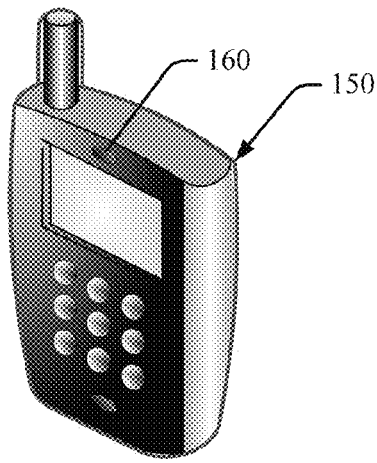

FIG. 3 is a schematic illustration of a strain measurement device 150 according to embodiments. Referring to FIG. 3, in some embodiments strain measurement device 150 may be embodied as a special purpose, hand-held electronic device. In alternate embodiments the strain measurement device 150 may be embodied as a general-purpose device such as a mobile telephone, a personal digital assistant (PDA) or the like in which specific functionality may be provided by one or more logic modules programmed in the device.

Strain measurement device 150 may include an RF transceiver 152 to transceive RF signals and a signal processing module 154 to process signals received by RF transceiver 150. RF transceiver may implement a local wireless connection via a protocol such as, e.g., Bluetooth or 802.11x. IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11 G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Strain measurement device 150 may further include a processor 156 and a memory module 158. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit. The processors may have a single-core or a multi-core design. In some embodiments, memory module 158 includes random access memory (RAM); however, memory module 158 may be implemented using other memory types such as dynamic RAM (DRAM), synchronous DRAM (SDRAM), and the like.

Strain measurement device 150 may further include one or more input/output interfaces such as, e.g., a camera 160 and a display 162. Referring back to FIG. 1C, an image of the strain indicator 130 may be obtained using the camera 160 of the strain measurement device 150. The image of the strain indicator may be stored in the memory module 158.

At operation 230 the damaged area of the structural surface 110 is subjected to stress. The stress may be applied in a controlled environment, e.g., by applying a predetermined pressure to the area of the structural surface 110 proximate the patch 120. Alternatively stress may be applied in an uncontrolled manner by putting the vehicle back in use, e.g., on a test run.

After the damaged area of the structural surface 110 is subjected to stress another strain measurement may be obtained using the strain measurement device 150 (operation 235). Next the two (or more) strain measurements are analyzed to determine whether the measurements indicate that repair patch 120 has incurred an excessive change in strain. By way of example, an excessive increase in strain on the strain indicator might indicate that the underlying defect 120 is growing. Conversely, an excessive decrease in strain might indicate that the adhesive between the repair patch 120 and the surface 110 has disbonded.

Thus, at operation 240 the strain measurements are compared, and if, at operation 245, the difference between the strain measurements does not exceed a threshold, then control passes back to operation 230 and the repair area may be subjected to stress again. By way of example, the vehicle may be put into use for a particular period of time after which another strain measurement is collected, e.g., as part of a maintenance routine. By contrast, if at operation 245 the difference exceeds a threshold then control is passed to operation 250 and a signal is generated. The signal may be used to trigger the presentation of a warning on a user interface such as the display 162 of the strain measurement device 150. The warning may be visual and/or auditory.

In some embodiments the strain measurement device 150 may comprise an evaluation module 159 embodied as logic instructions stored in the memory module 158 which implements the image collection and analysis operations depicted in FIG. 2. For example, in embodiments using a two-dimensional strain indicator as described with reference to FIG. 6, the evaluation module may overlay a Cartesian coordinate system on the images of the strain indicator. A geometric feature such as the center of each square or the intersecting corner of adjacent squares may be located on the Cartesian coordinate system. Any deviations in location for the same geometric feature(s) may be recorded and compared to a threshold value. In embodiments using a one-dimensional strain indicator as described with reference to FIG. 7, the evaluation module may determine a distance between adjacent lines on the strain indicator. Again, deviations in distance for the same lines may be recorded and compared to a threshold value.

The threshold value(s) against which deviations may be compared in operation 245 may be static thresholds or dynamic thresholds. By way of example, static threshold values may be set as a predetermined value or as a predetermined percentage of the distance between the geometric features. By contrast, dynamic thresholds may be adjusted over time based on cumulative measurements of the distances over time.

Figure 4:
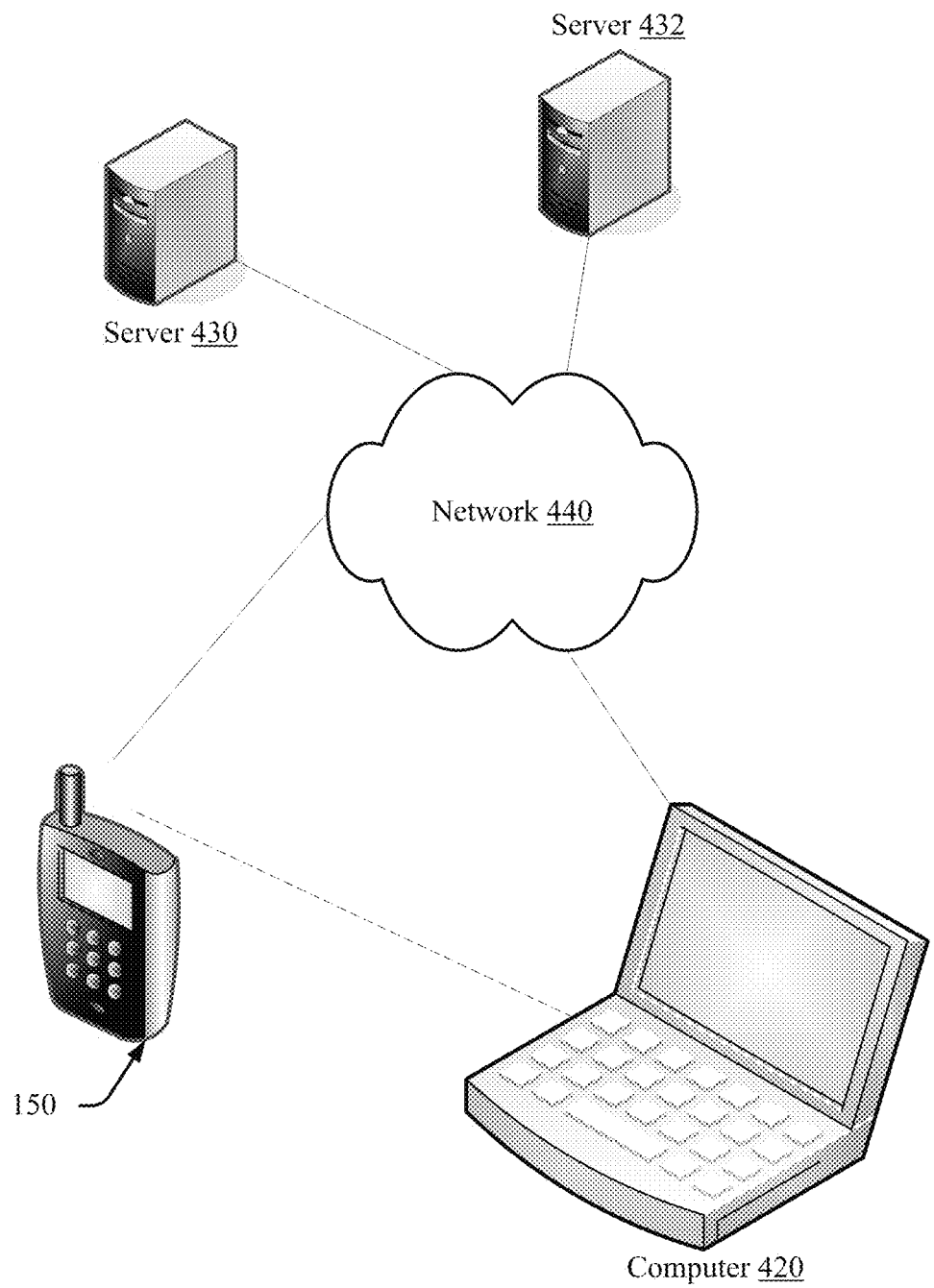
FIG. 4 is a schematic illustration of a computing environment for assessing structural repair integrity, according to embodiments.

In some embodiments the strain measurement device 150 may be a stand-alone device. In other embodiments the strain measurement device 150 may operate within the context of a larger, networked computer-based system. FIG. 4 is a schematic illustration of a computing environment for assessing structural repair integrity, according to embodiments. Referring to FIG. 4, a strain measurement device 150 may be coupled to one or more computing resources such as a computer 420 and one or more servers 430, 432 via a network 440. In some embodiments strain measurement device 150 may be embodied as a mobile telephone, PDA or other mobile computing device as described with reference to strain measurement device 150, above. Network 440 may be embodied as a public communication network such as, e.g., the internet, or as a private communication network, e.g., a local area network (LAN) or the like. Servers 430, 432 may be embodied as computer systems. Computer 420 may be embodied as a mobile computer, desktop computer, or other similar computing device.

Figure 5:
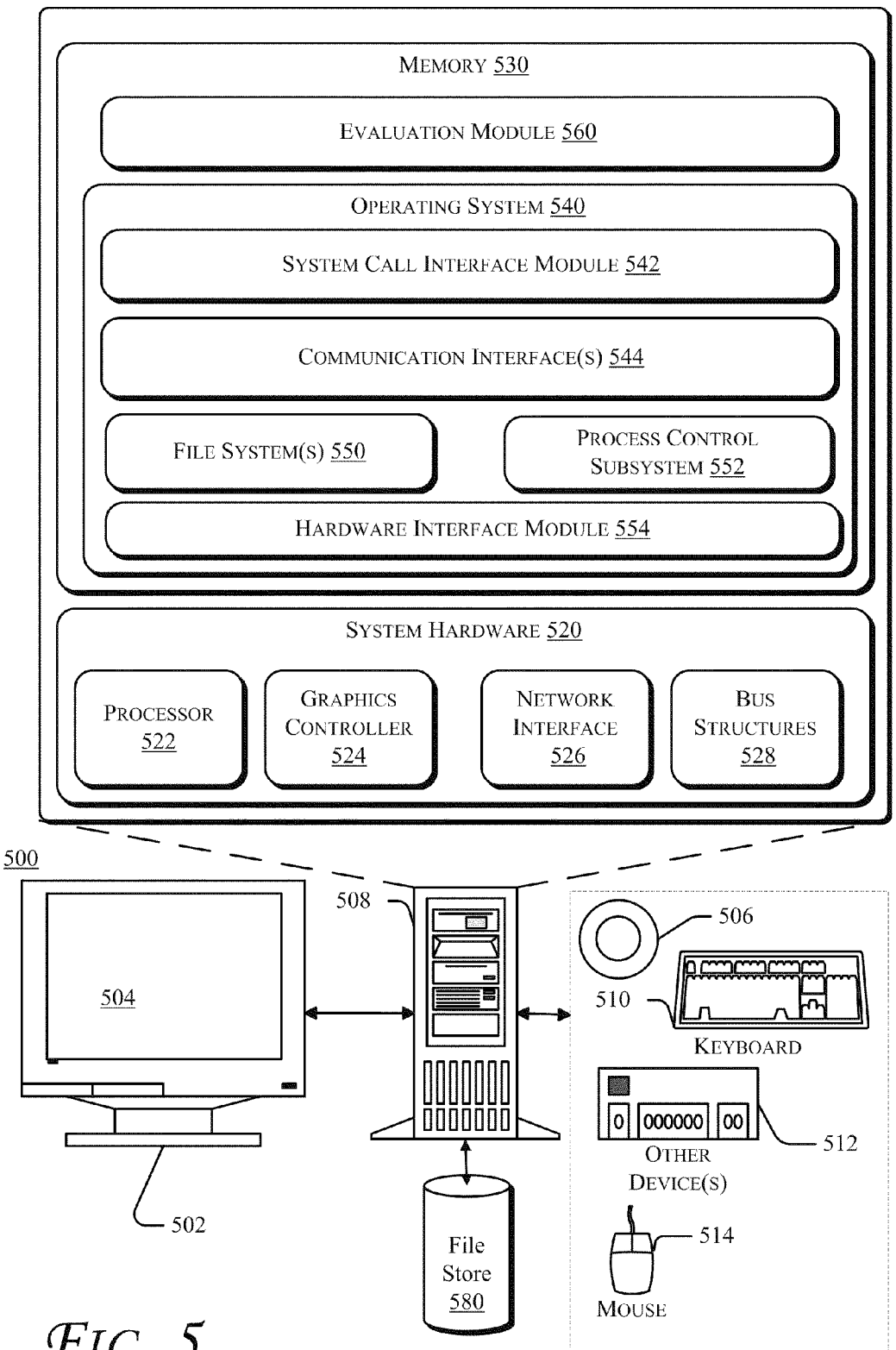
FIG. 5 is a schematic illustration of a computing device, according to embodiments.

In a networked, computer-based system one or more of the computer systems include an evaluation module adapted to implement the analysis operations described with reference to FIG. 2. FIG. 5 is a schematic illustration of a computing system 500 that may be used to assess structural repair integrity in the computer 420, or servers 430, 432. In some embodiments, system 500 includes a computing device 508 and one or more accompanying input/output devices including a display 502 having a screen 504, one or more speakers 506, a keyboard 510, one or more other I/O device(s) 512, and a mouse 514. The other I/O device(s) 512 may include a touch screen, a voice-activated input device, a track ball, and any other device that allows the system 500 to receive input from a user.

The computing device 508 includes system hardware 520 and memory 530, which may be implemented as random access memory and/or read-only memory. A file store 580 may be communicatively coupled to computing device 508. File store 580 may be internal to computing device 508 such as, e.g., one or more hard drives, CD-ROM drives, DVD-ROM drives, or other types of storage devices. File store 580 may also be external to computer 508 such as, e.g., one or more external hard drives, network attached storage, or a separate storage network.

System hardware 520 may include one or more processors 522, video controllers 524, network interfaces 526, and bus structures 528. In one embodiment, processor 522 may be embodied as an Intel® Pentium we processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics controller 524 may function as an adjunction processor that manages graphics and/or video operations. Graphics controller 524 may be integrated onto the motherboard of computing system 500 or may be coupled via an expansion slot on the motherboard.

In one embodiment, network interface 526 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 528 connect various components of system hardware 528. In one embodiment, bus structures 528 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

Memory 530 may include an operating system 540 for managing operations of computing device 508. In one embodiment, operating system 540 includes a hardware interface module 554 that provides an interface to system hardware 520. In addition, operating system 540 may include a file system 550 that manages files used in the operation of computing device 508 and a process control subsystem 552 that manages processes executing on computing device 508. Further, memory module 530 may comprise an evaluation module 560 to implement the analysis operations described with reference to FIG. 2.

Operating system 540 may include (or manage) one or more communication interfaces that may operate in conjunction with system hardware 520 to transceive data packets and/or data streams from a remote source. Operating system 540 may further include a system call interface module 542 that provides an interface between the operating system 540 and one or more application modules resident in memory 530. Operating system 540 may be embodied as a UNIX operating system or any derivative thereof (e.g., Linux, Solaris, etc.) or as a Windows® brand operating system, or other operating systems.

A strain measurement device 150 used in the context of a networked computing environment as described with reference to FIG. 4 and FIG. 5 allows a strain management device 150 to be integrated into more comprehensive vehicle systems. By way of example, one or more of the servers 430, 432 may host a vehicle maintenance system. Readings from the strain measurement device 150 may be recorded in the vehicle maintenance system and may be used to schedule routine maintenance on the vehicle. Similarly, one or more of the servers 430, 432 may host a vehicle design system. Readings from the strain measurement device 150 may be recorded in the vehicle design system and used in subsequent design revisions for the vehicle.

In the method described with reference to FIG. 2 the strain indicator 130 was applied to the repair patch 120 after the repair patch 120 has been cured and the bond verified. In an alternate embodiment, described with reference to FIG. 9, the strain indicator 130 may be applied to the repair patch 120 when the patch is applied to the surface 110 proximate the structural repair. Thus, referring to FIG. 9, at operation 910 a repair patch 120 and a strain indicator 130 are applied to a repair area on the surface 110.

At operation 915 the repair patch 120 is set and cured. As described with reference to FIG. 2, the repair patch 120 may be secured to the structural surface 110 by a variety of fastening methods, e.g., by screws, rivets, an adhesive, or even by a weld. In embodiments in which the patch 120 is secured by an adhesive the adhesive bond between the patch and the underlying surface 110 may be cured by heating the patch using, e.g., a thermal blanket or the like. Again, the integrity of the bond between the repair patch 120 and the structural surface 110 may be verified (operation 920), e.g., using, any suitable non-destructive testing technique may be used to verify the integrity of the bond between the repair patch and the structural surface 110.

At operation 925 a first strain measurement is obtained from the strain indicator 130. As described above, in some embodiments a strain measurement may be obtained by generating an image of the strain gauge 130 using a strain measurement device 150. In the method depicted in FIG. 9 the repair patch is carrying a load and therefore is under strain when the first measurement is obtained at operation 925. Thus, the first measurement of the strain indicator may be considered to be calibrated to an environment in which the strain gauge is carrying a load as intended, and the strain indicator is calibrated such that the base reading reflects the strain in the repair patch 120 under load as intended.

Figure 9:
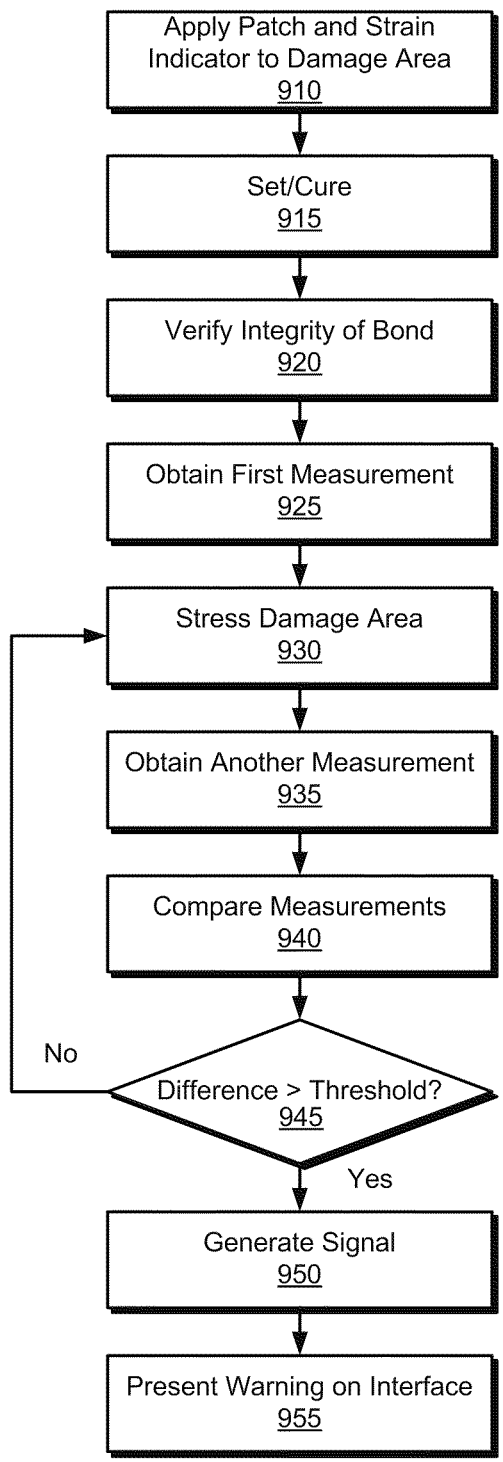
FIG. 9 is a flowchart illustrating operations in a method to assess structural repair integrity, according to embodiments.

The remaining operations in FIG. 9 are substantially similar to those described with reference to FIG. 2. Thus, at operation 930 the damaged area of the structural surface 110 is subjected to stress. As described above, the stress may be applied in a controlled environment, e.g., by applying a predetermined pressure to the area of the structural surface 110 proximate the patch 120. Alternatively stress may be applied in an uncontrolled manner by putting the vehicle back in use, e.g., on a test run.

After the damaged area of the structural surface 110 is subjected to stress another strain measurement may be obtained using the strain measurement device 150 (operation 935). Next the two (or more) strain measurements are analyzed to determine whether the measurements indicate that repair patch 120 has incurred a change in strain. Again, an excessive increase in strain on the strain indicator might indicate that the underlying defect 120 is growing. Conversely, an excessive decrease in strain might indicate that the adhesive between the repair patch 120 and the surface 110 has disbonded, at least in part.

Thus, at operation 940 the strain measurements are compared, and if, at operation 945, the difference between the strain measurements does not exceed a threshold, then control passes back to operation 230 and the repair area may be subjected to stress again. By way of example, the vehicle may be put into use for a particular period of time after which another strain measurement is collected, e.g., as part of a maintenance routine. By contrast, if at operation 245 the difference exceeds a threshold then control is passed to operation 950 and a signal is generated. The signal may be used to trigger the presentation of a warning on a user interface such as the display 162 of the strain measurement device 150. The warning may be visual and/or auditory.

As described with reference to FIG. 2, the threshold value(s) against which deviations may be compared in operation 245 may be static thresholds or dynamic thresholds. By way of example, static threshold values may be set as a predetermined value or as a predetermined percentage of the distance between the geometric features. By contrast, dynamic thresholds may be adjusted over time based on cumulative measurements of the distances over time.

In other embodiments a second strain measuring indicator 130 may be secured to the surface 110 in a region proximate the repair patch 120 to sense a primary load on the surface 110. Strain measurements from the strain measurement indicators 130 may be combined to yield a ratio of strain and thus, indicate a patch to skin stress ratio. This information, together with the subsequent strain measurements from the baseline to some later time can give indications of repair performance change, e.g., a damage such as disbond or material degradation.

Thus, described herein are embodiments of strain indicators which may be used with patches used to repair structural surfaces of vehicles. Also described are embodiments of a strain measurement device and computing systems in which a strain measurement device may be integrated, and methods to assess the integrity of structural repairs. In some embodiments the strain indicator may be positioned on the repair patch before the patch is placed under a load, such that the base strain reading on the patch is calibrated to include the strain in the patch caused by the load carried by the patch. In other embodiments the strain indicator may be positioned on the repair patch after the patch is placed under a load, such that the base strain reading is not calibrated to include the strain in the patch caused by the load carried by the patch.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method to assess the integrity of a structural repair to a structural surface, comprising:
   securing a patch over a defect in an underlying structural surface;
   verifying a bond between the patch and the underlying structural surface;
   applying a strain indicator to the patch;
   obtaining, in a strain measurement device, a first strain measurement from the strain indicator when the underlying structural surface is not subject to an external stress;
   applying at least one stress test to the structural repair;
   obtaining, in the strain measurement device, a second strain measurement from the strain indicator when the underlying structural surface is not subject to an external stress; and
   generating, in the strain measurement device, a signal when a difference between the first strain measurement and the second strain measurement exceeds a threshold.

2. The method of claim 1, wherein the strain indicator comprises at least one pattern on a surface, and wherein obtaining, in a strain measurement device, a first strain measurement from the strain indicator comprises determining at least one characteristic of the pattern.

3. The method of claim 2, wherein the pattern comprises a checkerboard pattern of alternating color blocks.

4. The method of claim 2, wherein the pattern comprises a repeating pattern of lines spaced at regular intervals.

5. The method of claim 1, wherein applying at least one stress test to the structural repair comprises applying a load to the surface.

6. The method of claim 5, wherein applying a load to the surface comprises subjecting the surface to stress in an operating environment.

7. The method of claim 1, further comprising storing the first strain measurement and the second strain measurement in a memory module coupled to the strain measurement device.

8. The method of claim 1, further comprising presenting an alert on a user interface coupled to the strain measurement device when a difference between the first strain measurement and the second strain measurement exceeds a threshold.

9. A strain measurement device to assess the integrity of a structural repair to a structural surface, comprising:
   a detector;
   a processor; and
   a memory module coupled to the processor and comprising logic instructions stored in a computer readable medium which, when executed by the processor, configure the processor to:
      use the detector to obtain a first strain measurement from an external strain indicator connected to a patch over a defect in an underlying structural surface when the underlying structural surface is not subject to an external stress;
      use the detector to obtain a second strain measurement from the measurement sensor after at least one stress test is applied to the structural repair when the underlying structural surface is not subject to an external stress; and
      generate a signal when a difference between the first strain measurement and the second strain measurement exceeds a threshold.

10. The strain measurement device of claim 9, wherein the strain indicator comprises at least one pattern on a surface, and further comprising logic instructions stored in a computer readable medium which, when executed by the processor, configure the processor to determine at least one characteristic of the pattern.

11. The strain measurement device of claim 10, wherein:
    the pattern comprises at least one of a checkerboard pattern of alternating color blocks or a repeating pattern of lines spaced at regular intervals; and
    the detector comprises a camera to acquire an image of the pattern.

12. The strain measurement device of claim 9, further comprising logic instructions stored in a computer readable medium which, when executed by the processor, configure the processor to store the first strain measurement and the second strain measurement in a memory module coupled to the strain measurement device.

13. The strain measurement device of claim 9, further comprising logic instructions stored in a computer readable medium which, when executed by the processor, configure the processor to present an alert on a user interface coupled to the strain measurement device when a difference between the first strain measurement and the second strain measurement exceeds a threshold.

14. A computer program product to assess the integrity of a structural repair to a surface comprising logic instructions stored in a computer readable medium which, when executed by a processor, configure the processor to:
    receive a first strain measurement from an external strain indicator connected to a patch over a defect in an underlying structural surface when the underlying structural surface is not subject to an external stress;
    receive a second strain measurement from the measurement sensor after at least one stress test is applied to the structural repair when the underlying structural surface is not subject to an external stress; and
    generate a signal when a difference between the first strain measurement and the second strain measurement exceeds a threshold.

15. The computer program product of claim 9, wherein the strain indicator comprises at least one pattern on a surface, and further comprising logic instructions stored in a computer readable medium which, when executed by the processor, configure the processor to determine at least one characteristic of the pattern.

16. The computer program product of claim 14, further comprising logic instructions stored in a computer readable medium which, when executed by the processor, configure the processor to store the first strain measurement and the second strain measurement in a memory module coupled to the strain measurement device.

17. The computer program product claim 14, further comprising logic instructions stored in a computer readable medium which, when executed by the processor, configure the processor to present an alert on a user interface coupled to the strain measurement device when a difference between the first strain measurement and the second strain measurement exceeds a threshold.

18. A system to assess the integrity of a structural repair to a surface, comprising:
- a strain indicator which may be applied proximate the structural repair;
- a detector to obtain a first strain measurement from an external strain indicator connected to a patch over a defect in an underlying structural surface when the underlying structural surface is not subject to an external stress and a second strain measurement from the measurement sensor after at least one stress test is applied to the structural repair when the underlying structural surface is not subject to an external stress;
- a memory module to store the first strain measurement and the second strain measurement; and
- an evaluation module to generate a signal when a difference between the first strain measurement and the second strain measurement exceeds a threshold.

19. The system of claim 18, wherein the strain indicator comprises at least one pattern on a surface, and further comprising logic instructions stored in a computer readable medium which, when executed by the processor, configure the processor to determine at least one characteristic of the pattern.

20. The system of claim 18, wherein:
- the pattern comprises at least one of a checkerboard pattern of alternating color blocks or a repeating pattern of lines spaced at regular intervals; and
- the detector comprises a camera to acquire an image of the pattern.

21. The system of claim 18, further comprising a user interface to present an alert when a difference between the first strain measurement and the second strain measurement exceeds a threshold.

* * * * *